March 5, 1968 N. L. DOUGLAS 3,372,250

ALL-PURPOSE TIMER

Filed April 20, 1966

INVENTOR
Norman L. Douglas

BY Spencer & Kaye
ATTORNEYS 3,372,250

ALL-PURPOSE TIMER

Norman L. Douglas, 119 E. Fudge St., Covington, Va. 24426

Filed Apr. 20, 1966, Ser. No. 543,925
10 Claims. (Cl. 200—38)

The present invention relates to an all-purpose timer and more particularly to a timer arrangement for the selective actuation of one or several devices having electrically operated members.

According to prior art arrangements, time clocks for turning on and off single devices or groups of such devices, wherein each device requires the same electrical input for actuation are well known. Thus, it is known to provide a time clock for switching on and off lights in a building and other electrically operated devices, each of which are fed with, for example, 110 volts, 60 cycles alternating current. However, when the electrical devices require different voltages, voltages having a frequency other than 60 cycles per second, or where a particular amperage is required, in general, a single conventional time clock arrangement would not serve for each of these purposes. Therefore, in prior art arrangements for each of these different uses, an individual time clock arrangement was provided.

It is therefore an object of the present invention to provide an all purpose timer which overcomes the aforementioned disadvantages of the prior art arrangements.

It is another object of the present invention to provide an all purpose timer which may be interchangeably used for actuating electrical devices having different voltage, frequency, or amperage requirements.

It is a further object of the present invention to provide an all purpose timer which serves for simultaneously operating several electrical devices having different electrical requirements.

In essence, the objects of the present invention are attained by providing an all purpose timer in which the required electrical inputs for the served devices are fed to the timer arrangement and conductive path establishing means are provided for selectively establishing a conductive path from the input of the timer arrangement to the output thereof whereat the served electrical devices are connected.

In accordance with a feature of the present invention, the time clock portion of the timer may be made independent of the electrical requirements for the electrical devices which it operates and the conductive path establishing means includes a wafer stepping switch which is rotated by the time clock portion and thereby selectively establishes a conductive path between the input and the output of the timer.

According to a further feature of the present invention, the electrical input to the timer may be either an alternating current voltage or a direct current voltage, the frequency of the alternating current voltage being that frequency required by the served electrical devices. Thus, the conductive path establishing means according to the present invention is adapted for carrying the desired electrical requirements irrespective of the requirements or variations therein. Also, at the output of the switching arrangement, there may be provided transformers, other switching arrangements, voltage converters and other electrical devices from which the required electrical needs for the served devices is provided.

Additional objects and advantages of the present invention will become apparent upon consideration of the following description when taken in conjunction with the accompanying drawings in which.

Figure 1:
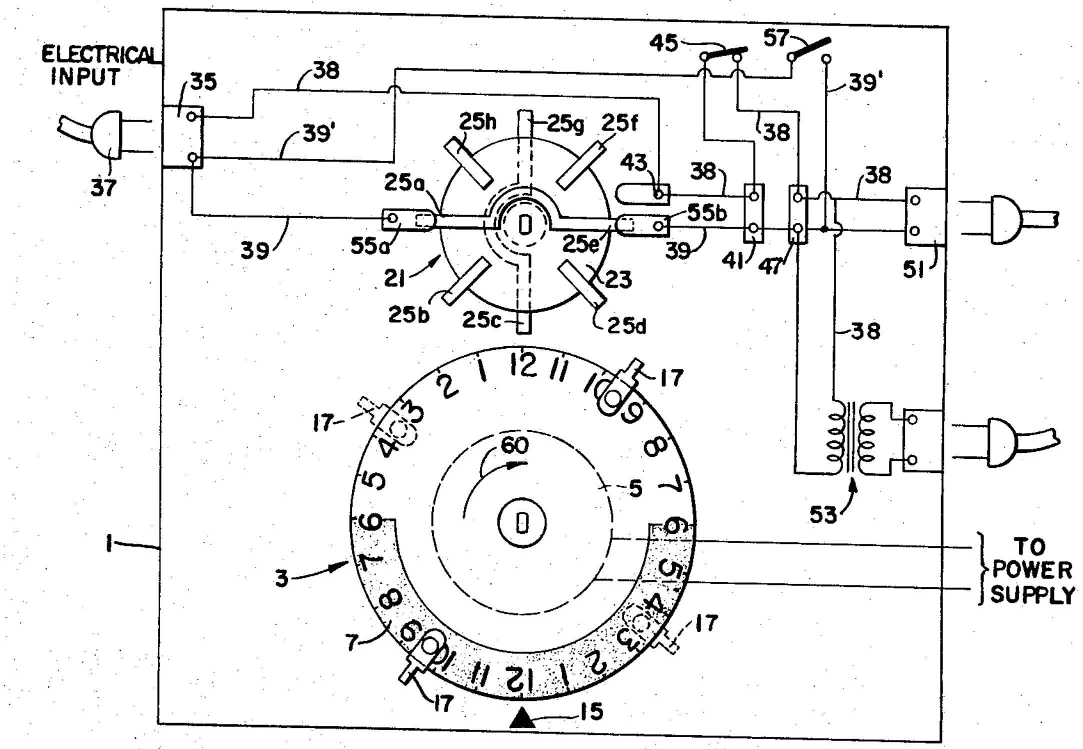
FIGURE 1 is a front view of an all purpose timer according to the present invention, the circuit for the timer being shown schematically.
Figure 2:
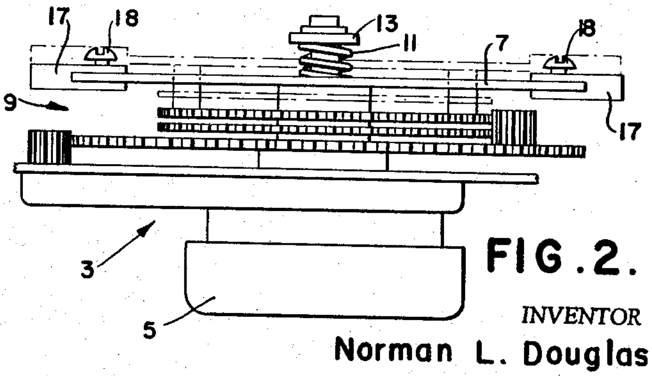
FIGURE 2 is a bottom view of the time clock portion according to the present invention.

Referring now to the drawings, there is shown in FIGURE 1 an all purpose timer according to the present invention disposed within a housing 1. The timer includes a time clock arrangement 3 comprising a driving mechanism 5 and a rotating clock plate 7 coupled thereto via a suitable gearing arrangement 9. The time clock portion is shown more clearly in FIGURE 2 with the driving mechanism 5 being constituted by a clock motor which is connected to a suitable power supply. Generally, this power supply will be a 110 volt alternating current, 60 cycle input. However, the driving mechanism could also be in the form of a spring wound clock motor so that no electrical input is required for driving the clock plate. The rotating plate 7 is provided with numerals representing a 24-hour period or other period depending upon the gearing arrangement with the clock motor. As shown in FIGURE 2, the rotating plate 7 is pressed downwardly toward the gearing arrangement by a biassing spring 11 which is positioned by a nut 13. The plate 7 may be lifted, as shown in dashed lines, and rotated so that the correct time is indicated by the arrow head 15 located below the plate 7.

About the periphery of the rotating plate, there are arranged a plurality of switch fingers 17 which are fastened by screws 18 to the clock plate. The fingers 17 are placed at the desired position about the rotating plate and serve for turning on and off the electrically operated devices as will be discussed below.

As further shown in FIGURE 1, arranged for cooperation with the clock portion of the timer is a conductive path establishing means including a rotating wafer switch assembly 21. The assembly includes an electrically insulated rotating plate 23 having, in the illustrated embodiment, eight stationary conductive bars 25 extending radially therefrom. As shown, alternate ones of these bars are electrically connected with the bar which is diametrically opposite so that bars **25*a* and 25*e* are electrically connected and also bars 25*c* and 25*g*, these electrically connected bars being insulated from each other by being disposed on opposite sides of the rotating plate 23. The bars 25*b*, *d*, *f* and *h*** serve as dummy contact bars and are not electrically connected.

Figure 3:
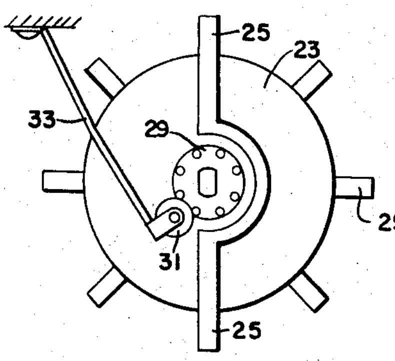
FIGURE 3 is a rear view of the wafer stepping switch according to the present invention.
Figure 4:
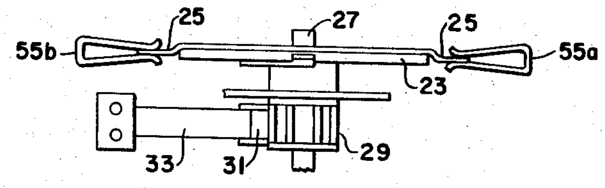
FIGURE 4 is a top view of the wafer stepping switch showing the establishing of a conductive path and the notched member having a spring detent according to the present invention.

As shown in FIGURES 3 and 4, the plate 23 is rotatably mounted on a shaft 27 having a notched member 29 also arranged on the same shaft. A detent in the form of a roller 31 is biased by a suitably mounted leaf spring 33 into a notch of the notched member 29. Thus, the spring detent serves for maintaining the plate 23 and the bar members 25 in the desired position. The notched member 29 is cylindrical in shape and is formed with a plurality of notches in the cylindrical wall thereof, the number of notches corresponding to the number of conductive bars arranged on the plate 23.

Referring again to FIGURE 1, the circuit arrangement for the conductive path establishing means of the timer is shown in the upper portion of the housing. In the upper left-hand portion, an input plug arrangement 35 is provided and is adapted to have any desired input for the served electrical devices applied thereto, for example, by means of a plug 37. Both a hot wire 38 and a ground wire 39 lead from this input plug, with the hot wire being connected to a terminal of a mounting block 41 via a terminal 43. From the mounting block 41, the wire is then connected via a switch 45 to a terminal of an output mounting block 47 from which the hot wire is connected to several output arrangements including an output plug 51 and an output transformer arrangement 53 electrically connected in parallel with the plug 51. The ground wire 39 is connected from the input plug 35 to a first U-shaped contact member 55*a* which is mounted within the timer for receiving respective ones of the conductive bars 25 between the legs thereof and establishing electric contact. As shown in FIGURE 1, when the bar 25*a* is in contact with member 55*a*, an electrical path is formed for the ground wire through the conductive bars 25*a* and 25*e* to a second U-shaped contact member 55*b* which is also adapted to receive respective ones of the conductive bars 25. The ground wire 39 is then connected between the contact 55*b* to a terminal of the output mounting block 47 via the mounting block 41. As with the hot wire, the ground wire is connected to the plug 51 and the transformer 53 so as to complete the electrical circuit for these output devices. Thus, the ground wire represents an open circuit in the timer, with the circuit being closed only when the contacts 55*a* and 55*b* are bridged by the conductive bars of the wafer switch assembly 21. However, the time switching arrangement may be bypassed when desired in that a further ground wire 39′ leads from the input plug 35 to the output mounting block 47 via a switch 57. Thus, by closing the switches 45 and 57, the time switching arrangement may be bypassed with the electrical input to the timer being continuously supplied to the illustrated output devices 51 and 53.

Referring now to the operation of the all purpose timer, the clock motor may be operated independently of the electrical input for the device, or if the input is 110 volts alternating current at 60 cycles per second, the clock motor may be fed by the input to the timer by connection with the plug 35, the clock motor then being in parallel connection with the remainder of the circuit. However, for description purposes, the clock motor is shown as being connected to a separate input in FIGURE 1. Accordingly, any desired input either in the form of alternating current or direct current voltage with any desired frequency or amperage characteristics may be fed into the timer at the plug 35, with the electrical input then being fed through the timer to the output thereof. The switch 45 is closed so as to provide a closed path for the hot wire and the switch 57 is opened so as to permit the contacts 55 to be bridged and to complete the closed circuit thereby establishing a conductive path for the input to the timer. In operation, as the clock plate 7 rotates, one of the finger switches 17 engages the conductive bar 25 located in the most downward position of the wafer switch assembly, conductive bar 25*c* being shown in this position in FIGURE 1. Upon rotation of the clock plate, the finger switch 17 causes the wafer switch assembly to be rotated one position by pressing against the bar 25*c*. Due to this pressure, the switch plate tends to rotate thereby forcing the spring detent 31 from one of the notches in the member 29 and into the next adjacent notch such that the switch plate is rotated one position. Thus, the direction of rotation for the clock plate being indicated by arrow 60, the bar 25*c* is moved into the position vacated by bar 25*d* which then contacts the member 55*b*. Simultaneously, the conductive bar 25*h* comes into contact with contact member 55*a*, thereby opening the conductive path of the ground wire which in turn deactivates the electrically served devices. Upon continued rotation of the clock plate 7, the one finger switch 17 will engage the conductive bar 25*b* and cause a further stepping of the wafer switch assembly 21. Thus, conductive bars 25*g* and 25*c* will bridge the contacts 55 and again form a complete conductive path such that the served electrical devices will again be activated.

Figure 5:
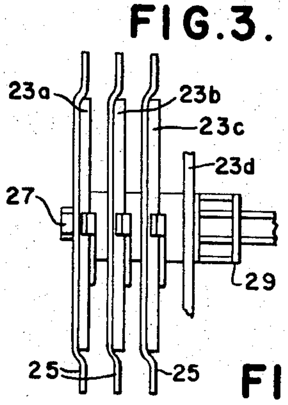
FIGURE 5 is a side view of another embodiment of the wafer switching arrangement according to the present invention showing a ganged arrangement of wafer switching plates.

Referring again to FIGURE 1, two electrical output devices are shown for the output circuit of FIGURE 1, there being a plug 51 and a step-up or step-down transformer 53 electrically connected in parallel therewith and the output of these devices being connected to the served electrical devices. In accordance with a further embodiment of the present invention, as shown in FIGURE 5, the wafer switch assembly 21 may comprise a plurality of wafer plates 23*a* to 23*d*, each mounted for rotation on the shaft 27 with notched member 29 also being mounted thereon. Each of the plates is provided with conductive bars 25 similar to those shown in FIGURE 1, with a plurality of the conductive path circuits being provided in the timer. Thus, the conductive bars on each of the switching plates come into contact with contact members arranged in a respective circuit such that an input for each of the circuits is fed through the output of the circuit when the contacts are bridged. Accordingly, different voltages and the like may be fed into respective circuits for connection through to an electrical device requiring such input. It should also be noted that a single clock plate having the switching fingers thereon for contacting the conductive members of one of the ganged switch plates will serve for operating all of the switches of the wafer switch assembly.

Although as shown in FIGURE 1, the output terminal 47 is only provided with two output devices, the present invention is not limited thereto. Thus, outlets may also be provided from a single output device or a plurality of output devices as described above. These outputs may be to further transformer arrangements, relays, motors and the like for operating any electrical devices. For example, it has been found that with a transformer output for the timer according to the present invention, electrically operated valves may be switched on and off, a transformer being required since these valves generally operate with a voltage supply less than 110 volts. In such an arrangement, for example, a heating arrangement, by actuating an electrically operated valve with the timer, a gas or oil burner may be operated for supplying heat to a building. Also, any known electrical device may be operated individually or the devices may be ganged for a group operation such as for turning on and off all the lights of the building, operating a plurality of motors, or operating groups of relays which in turn operate various electrical devices. It should be readily apparent, that although only two finger switches are shown on the clock plate, for operating the switching arrangement, a plurality of such finger switches may be provided. Two of the switches are required for the complete operation of the device that is for turning on and turning off the device and these switches may be arranged at the desired place about the periphery of the clock plate for activating and deactivating the electrical devices for any desired time period.

Thus, in accordance with the present invention, there is provided an all purpose timer which serves for turning on and off various electrical devices, which timer is independent of the electrical requirements for the served devices. As described above, the objects of the present invention are attained by feeding the required electrical output for the served devices as the input to the timer and switching this electrical input through various devices including relays, transformers and the like to the served devices for activating and deactivating the electrically operated members of these devices. Accordingly, a single timer in accordance with the present invention actuates and deactuates a plurality of served electrical devices where before a plurality of such timers was required.

The use to which the timer according to the present invention can be put is by no means limited to the specific exemplary purposes mentioned in the application, but can be used wherever an electrical circuit is to be time-controlled.

It will be understood that the above description of the present invention is susceptible to various modifications, changes and adaptations and the same are intended to be comprehended within the meaning and range of equivalents of the appended claims.

What is claimed is:

1. An all purpose timer for selectively actuating electrically operated devices independent of the electrical requirements for such devices, comprising in combination:

(a) electrical input means;

(b) electrical output means for supplying an output required for the actuation of the electrically operated devices connected thereto;

(c) conductive path establishing means electrically connected to said input means and said output means and including first and second contact members, said first contact member being electrically connected to said input means and said second contact member being electrically connected to said output means, and rotatable wafer switch means arranged for selectively connecting said first and second contact members to establish a closed conductive path between said input means and said output means, said switch means including a rotatable switch plate carrying a plurality of conductive bars, each of said bars extending radially from said plate and having another of said bars arranged diametrically opposite thereto, alternate ones of said contact bars being electrically connected with said diametrically opposed bar, said diametrically opposed bar being arranged for contacting said first and second contact members whereby two diametrically opposed and electrically connected bars form a closed conductive path between said first and second contact members so as to establish a conductive path between said input means and said output means;

(d) detent means operatively associated with said switch plate for fixing positions thereof wherein diametrically opposed bars are in alignment with said first and second contact members; and (e) clock means arranged for cooperation with said wafer switch means for rotating the same at desired intervals so as to selectively cause said electrically connected diametrically opposed conductive bars and said diametrically opposed conductive bars which are not electrically connected to contact said first and second contact members, said clock means including a rotating plate having projecting finger means corresponding to the desired time switching for the electrical devices connected to the output means of the timer, said finger means upon rotation of said clock plate engaging one of said conductive bars of said switch means for pressing against such bar to cause rotation of said switch plate, said detent means fixing a different position of said switch plate and two different diametrically opposed conductive bars contact said first and second contact members.

2. A timer as defined in claim 1 wherein said detent means include a cylindrical member mounted for rotation with said rotatable switch plate and having a plurality of notches about the cylindrical surface thereof, said notches corresponding in number to the number of said conductive bars, a detent member receivable in said notches for maintaining the rotated position of said switch plate, and spring means biassing said detent member into said notches of said cylindrical member.

3. A timer as defined in claim 2 wherein said spring biassing means is a leaf spring and wherein said detent member is a roller mounted at one end of said leaf spring.

4. A timer as defined in claim 1 wherein said conductive path establishing means includes first and second electrical connections between said input means and said output means, said first electrical connection being formed by said wafer switch means and said second electrical connection being constituted by a conductor having a switch therein, said switch when closed providing a conductive path between said input and said output means.

5. A timer as defined in claim 4 and further comprising a third electrical connection between said input means and said output means, said third electrical connection having a further switch therein, said third electrical connection cooperating with said second electrical connection for providing a conductive path between said input means and said output means such that said first electrical connection is by-passed and said input means is continuously connected to said output means.

6. A timer as defined in claim 1 wherein said clock means further includes an electrically operated clock motor coupled to said clock plate via a gearing arrangement such that said clock plate rotates through one revolution during a predetermined time period.

7. A timer as defined in claim 1 and further including a spring wound clock motor coupled to said clock plate via a gearing arrangement such that said clock plate rotates through one revolution during a predetermined time period.

8. A timer as defined in claim 1, including a plurality of input means, a plurality of output means, and plurality of said conductive path establishing means being arranged for electrical connection with respective ones of said input means and said output means.

9. A timer as defined in claim 8 wherein said wafer switch means includes a plurality of switch plates having said opposed conductive bars arranged thereon, said plates being positioned in a ganged arrangement such that said opposed conductive bars which are electrically connected contact respective ones of said first and second contact members to establish a closed conductive path between said input and said output means.

10. A timer as defined in claim 1 and further comprising a transformer coupled to said output means, said transformer being arranged for connection to an electrically operated device, and a plug arrangement connected to said output means in parallel with said transformer, said plug arrangement being arranged for connection to another electrically operated device for supplying the required electric input thereto.

No references cited.

BERNARD A. GILHEANY, *Primary Examiner.*

F. E. BELL, *Assistant Examiner.*